United States Patent [19]
Wildgen

[11] Patent Number: 5,887,338
[45] Date of Patent: Mar. 30, 1999

[54] METHOD FOR PRODUCING A TEMPERATURE SENSOR WITH TEMPERATURE-DEPENDENT RESISTANCE

[75] Inventor: Andreas Wildgen, Nittendorf, Germany

[73] Assignee: Siemens Aktiengesellschaft, Munich, Germany

[21] Appl. No.: 959,003

[22] Filed: Oct. 28, 1997

Related U.S. Application Data

[63] Continuation of PCT/DE96/00734, Apr. 26, 1996.
[51] Int. Cl.$^6$ .................................................... H01C 7/04
[52] U.S. Cl. ............................... 29/612; 29/613; 29/619; 29/840; 29/841; 29/874; 29/412; 338/22 R
[58] Field of Search ............................... 29/612, 613, 619, 29/621, 840, 841, 874, 412; 228/180.22; 338/22 R

[56] References Cited

U.S. PATENT DOCUMENTS

| | | | |
|---|---|---|---|
| 3,603,150 | 9/1971 | Kurtin et al. | 29/612 |
| 4,480,376 | 11/1984 | Høkanson | 29/612 |

FOREIGN PATENT DOCUMENTS

| | | | |
|---|---|---|---|
| 4237039A1 | 5/1994 | Germany . | |
| WO96/34260 | 4/1996 | WIPO . | |

OTHER PUBLICATIONS

"Thick–Film Thermistor and Its Applications"(Ikegami et al.), IEEE Transactions on Components, Hybrids, and Manufacturing Technology, vol. CHMT–3, No. 4, Dec. 1980.
Japanese Patent Abstract No. 1270301 (Nobuyoshi et al.), dated Oct. 27, 1989.
Japanese Patent Abstract No. 5135908 (Takeshi et al.), dated Nov. 11, 1991.
Japanese Patent Abstract No. 61–147125 (Ishizaki), dated Jul. 4, 1986.
Japanese Patent Abstract No. 4280602 (Junichi et al.), dated Mar. 8, 1991.

*Primary Examiner*—P. W. Echols
*Attorney, Agent, or Firm*—Herbert L. Lerner; Laurence A. Greenberg

[57] ABSTRACT

A temperature sensor, which is used particularly in the intake tube of internal combustion engines in conjunction with an air flow rate meter, includes a sensor element that is constructed as a temperature-dependent NTC resistor in the form of a pill, a cube or the like. A large number of identical temperature sensors are produced by applying a plurality of parallel conductor tracks, which include partial conductor tracks, to a glass plate or wafer, by providing the conductor tracks with outer solderable contact surfaces and inner solderable contact surfaces, by applying and electrically conductively connecting each sensor element to a first partial conductor track, by conductively connecting the sensor element to a second partial conductor track, by coating the sensor element with a resist layer, and by cutting apart the wafer with parallel cuts extending between the individual sensor elements.

3 Claims, 2 Drawing Sheets

METHOD FOR PRODUCING A TEMPERATURE SENSOR WITH TEMPERATURE-DEPENDENT RESISTANCE

CROSS-REFERENCE TO RELATED APPLICATION:

This application is a continuation of International Application Ser. No. PCT/DE96/00734, filed Apr. 26, 1996.

BACKGROUND OF THE INVENTION:

Field of the Invention:

The invention relates to a temperature-dependent component, in particular a temperature sensor for use in an intake tube for internal combustion engines in conjunction with an air flow rate meter, including a sensor element formed of a temperature-dependent resistor body in the form of a pill, a cube or the like which is secured to a striplike substrate of glass or ceramic and is electrically conductively connected to conductor tracks applied to the substrate, and a resist layer coating the sensor element. The invention also relates to a method for producing the temperature sensor.

Such temperature sensors and components are used, among other fields, in the intake tube of motor vehicle engines, specifically for the sake of precise engine control. The temperature sensor is installed together with an air flow rate meter in the intake tube, between the throttle valve and the air filter.

In one known method for producing temperature sensors with a pair of plug contacts and a resistance element, specifically in the form of disks, pills or the like, the housing, which includes a plug flange and a mounting part that carries the pairs of plug contacts, is produced in one injection molding operation. In a further injection molding operation, an insulating cap is produced, which receives the sensor element in the form of a hot or cold-conductor track (German Published, Non-Prosecuted Patent Application DE 42 37 039 A1).

In another known method for producing components with a temperature-dependent resistance, which are so-called thermistors (JP 4-280602A, Patent Abstracts of Japan, E-1322, Feb. 19, 1993, Vol. 17, No. 85), a plurality of conductor tracks extending in pairs are applied to a substrate, and then sensor elements are each soldered to two conductor tracks located side by side. The sensor elements and the conductor tracks are sealed with a glass layer. Finally, the substrate is severed between each two pairs of successive conductor tracks. The components which are created in that way are relatively wide.

The known temperature sensors are mounted together with their housing in the intake tube, but as a rule their response time is not as fast as precise modern engine control requires.

SUMMARY OF THE INVENTION:

It is accordingly an object of the invention to provide a method for producing a temperature sensor and a component with temperature-dependent resistance, which overcome the hereinafore-mentioned disadvantages of the heretofore-known methods and devices of this general type and which provide temperature sensors that are distinguished by a very fast response time. Moreover, the individual temperature sensors should agree well in terms of their electrical properties. In other words, production variations should be kept as slight as possible and they should occupy as little space as possible.

With the foregoing and other objects in view there is provided, in accordance with the invention, a method for producing temperature sensors, in particular for use in the intake tube of internal combustion engines, which comprises applying a plurality of parallel conductor tracks to a glass plate forming first and second partial conductor tracks located one after the other; providing each of the partial conductor tracks with one outer solderable contact surface and one inner contact surface; electrically conductively connecting one respective sensor element formed of a temperature-dependent resistor body in the form of a pill, a cube or the like to the inner contact surface of each of the first partial conductor tracks; applying a respective insulating resist track between the sensor element and the inner contact surface of each of the second partial conductor tracks; electrically conductively connecting the sensor elements to the inner contact surface of the second partial conductor tracks; coating the sensor elements and the inner contact surfaces with a resist layer; and cutting apart the glass plate with parallel cuts extending between the individual sensor elements to form a plurality of identical temperature sensors.

In accordance with another mode of the invention, there is provided a method which comprises joining the sensor element and the inner contact surface of the second partial conductor track with a conductive adhesive, and performing the step of coating the inner contact surfaces and the sensor element with the resist layer after the conductive adhesive hardens.

With the objects of the invention in view there is also provided a temperature-dependent component, in particular a temperature sensor for use in the intake tube for internal combustion engines in conjunction with an air flow rate meter, comprising a striplike substrate selected from the group consisting of glass and ceramic; first and second partial conductor tracks disposed one after the other on the substrate, the partial conductor tracks each having respective outer and inner contact surfaces; a sensor element formed of a temperature-dependent resistor body in the form of a pill, a cube or the like secured to the striplike substrate, the sensor element having a first contact surface electrically conductively connected to the inner contact surface of the first partial conductor track, and the sensor element having a second contact surface electrically conductively connected to the inner contact surface of the second partial conductor track; an insulating resist track applied between the sensor element and the inner contact surface of the second partial conductor track; and a resist layer coating the sensor element.

In accordance with another feature of the invention, the sensor element is a chip which is made of a sintered NTC material.

In accordance with a further feature of the invention, the sensor element has a side facing away from the substrate, and a track of a silver conductive adhesive joins the side of the sensor element to the inner contact surface of the second partial conductor track.

In accordance with a concomitant feature of the invention, the resist layer coats the inner contact surfaces as well as the sensor element.

Other features which are considered as characteristic for the invention are set forth in the appended claims.

Although the invention is illustrated and described herein as embodied in a method for producing a temperature sensor and a component with temperature-dependent resistance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
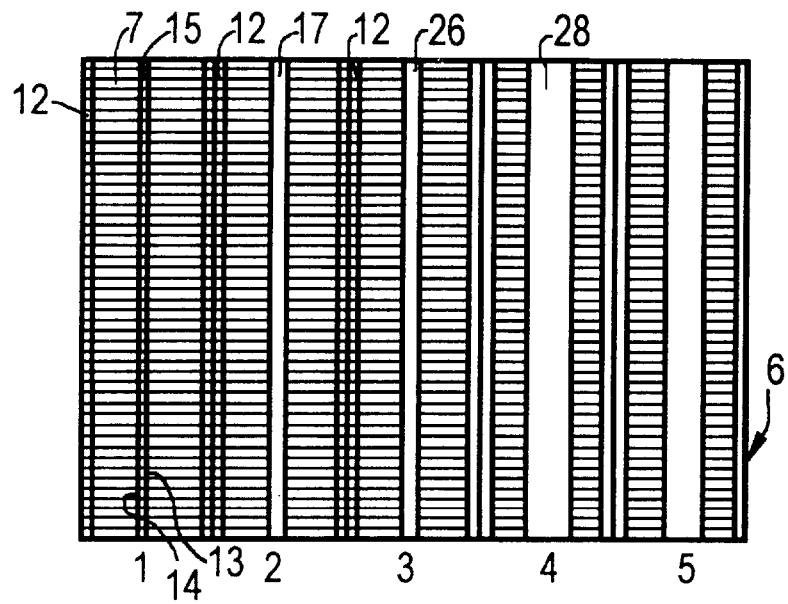
FIG. 1 is a diagrammatic plan view of a configuration of a relatively large number of temperature sensors on a glass plate or wafer, which is used to explain a production method of the invention.

DESCRIPTION OF THE PREFERRED EMBODIMENTS:

Referring now to the figures of the drawings in detail and first, particularly, to FIG. 1 thereof, there is seen a plurality of rows 1–5 of chips on a glass plate or wafer 6, which are each shown in different stages of a production method. Conductor tracks and solderable contact surfaces are applied by known methods, for instance by screen printing or by the thin-film technique, on the wafer 6 which has dimensions of 2×2 inches$^2$ and a thickness of 0.15 mm. Subsequent to the below-described production of many individual temperature sensors 7 (which are merely diagrammatically illustrated in FIG. 1 but are shown in greater detail in FIGS. 2 and 3), the temperature sensors 7 are "separated" in such a way that many individual substrate strips 8 with layers and elements applied on them are separated from one another by sawing, sandblasting, or the like. An individual temperature sensor 7 then has a dimension, for instance, of 9×0.6 or 7×0.7 mm$^2$.

Figure 2:
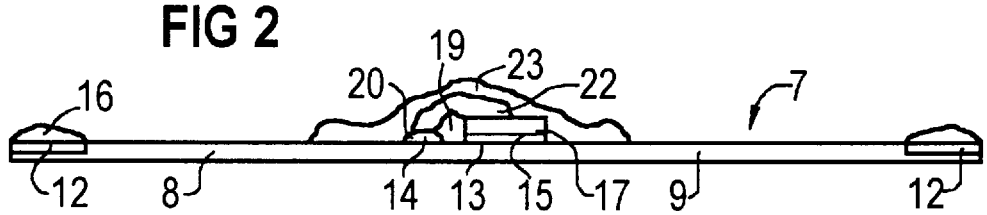
FIG. 2 is an enlarged sectional side view of a temperature sensor of the invention.
Figure 3:
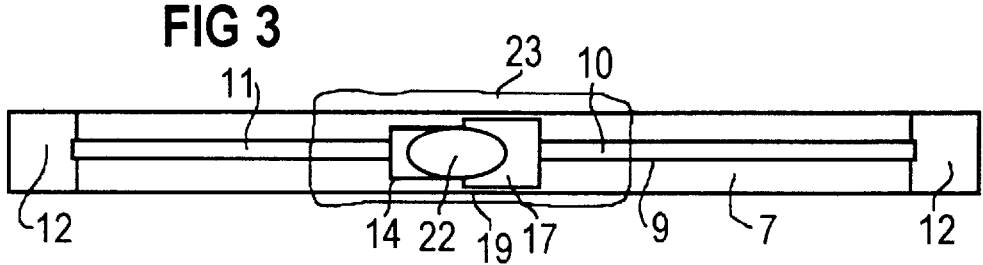
FIG. 3 is a plan view of the temperature sensor of FIG. 2.

A material forming conductor tracks 9 in FIG. 2 must be electrically conductive, wettable, economical and must adhere well to glass but it need not meet any other demands. As is seen in FIG. 3, the conductor track 9 has first and second partial conductor tracks 10 and 11 which are produced, for instance by cutting apart the conductor track 9. Two outer solderable contact surfaces 12 and two inner solderable contact surfaces 13 and 14 (in the example of FIG. 2) are applied, for instance, by screen printing, in the chip row 1. Both the solder used for the solderable contact surfaces 12, 13 and 14 and a conductive SMD adhesive 15 (SMD=surface mounted device) of tin or silver are applied in the form of continuous tracks to all of the temperature sensor substrate strips 8 of one chip row. The outer solderable contact surfaces 12 are intended for electrically connecting the temperature sensor 7. In other words, each of the surfaces 12 leads, for instance, through the plug of an air flow rate meter (see FIGS. 4 and 5) or of an individual temperature sensor to a non-illustrated engine control unit.

A sensor element 17 in the form of a pill, cube or the like that is formed of a temperature-dependent resistor material is soldered to the inner solderable contact surface (which is also referred to as a solder pad) 13, or is adhesively bonded to the conductive SMD adhesive 15, by adding heat. Since the sensor element is formed of a hot conductor resistor or NTC resistor in the exemplary embodiment, the sensor element will also be referred to below as an NTC chip 17. A spacing between the outer solderable contact surfaces of the NTC chip 17, that is its thickness, is approximately 250 μm. In the case of the solder pads 13 and 14, the thickness and quantity of the soldering tin are adapted to the size and shape of the NTC chip 17, so that no soldering tin will escape at the sides during soldering. The electrical conducting can be selectively performed with a silver conductive adhesive 15 as well.

An insulating resist track 19 is applied between the NTC chip 17 and the inner contact surface 14 on which a tin hump 20 may also be placed in individual cases. Specifically, the insulating resist track 19 is applied with a known resist metering device, which is moved with a table that is displaceable in the X and Y directions (neither that device nor the table is shown herein). After the resist has hardened, a further track or droplet 22 of a silver conductive adhesive is applied to the resist track 19, and an upper surface of the NTC chip 17 is joined to the inner contact surface 14 (or to the tin hump 20) through the use of this conductive adhesive. After the hardening, the NTC chip 17 and the soldering point 20 are coated with a resist layer 23. Given a suitable choice of material, it is possible to harden the resist layers 19 and 23 and the silver conductive adhesive 22 simultaneously. A terminal or contact surface of the NTC chip 17 which is located at the bottom in the drawing, that is the surface that is not provided with terminal wires in this case, is then electrically conductively connected to the first partial conductor track 10, and an upward-facing terminal or contact surface thereof is electrically conductively connected to the second partial conductor track 11.

In conclusion, individual parallel strips of the glass wafer 6, with the layers and elements made thereon, are cut off with a saw or some other suitable cutting tool, thus producing the individual temperature sensors 7. One of these individual temperature sensors is shown in a side view in FIG. 3 and in a plan view in FIG. 2.

In another method for producing a temperature sensor, individual method steps of which have already been described above, the conductor tracks 9 or 10 and 11 and the solderable contact surfaces 12 of all of the temperature sensors to be made on one glass wafer 6 are again applied by screen printing or the thin-film technique.

One continuous track of a conductive SMD adhesive 15 is then applied in the row or column 1 of FIG. 1. Individual sensor elements or NTC chips 26 are mounted on this track, and the adhesive 15 is hardened in the row or column 2 of FIG. 1.

Another example of a method according to the invention is performed as follows. The solderable contact surfaces 12, which are used for later installation of the temperature sensor 7 in an air flow rate meter, and the inner solder pads 13, 14 are provided with respective tin layers 16 and 20 for all of the approximately 300 temperature sensors 7 that are made on one wafer 6, by plunging the wafer 6 into a solder bath. The NTC chips 17 or 26 are soldered in an ironing soldering process in the row or column 3. Since this tinplates the conductor track as well, then in order to avoid thermal disadvantages, in the region of the NTC chip either a very thin track is provided, or a plastic covering is applied, or a layer of SMD adhesive is applied to a portion of the conductor track. After flux and other contaminants have been cleaned off, a layer of electrolysis resist 28 is applied over the row of NTC chips 26 in the row or column 4. This resist is adjusted in its viscosity and quantity in such a way that corners of the NTC chips 26 will be reliably covered. After drying and hardening of the resist, the wafer 6, as in the case of the example of FIG. 2 as well, is glued to a glass substrate using a suitable wax (commercially available under the designation "Morsa, Gußwachs 0.5 mm blau" [Morsa, casting wax 0.5 mm blue], and the individual temperature sensors 7 are severed by sawing.

Figure 4:
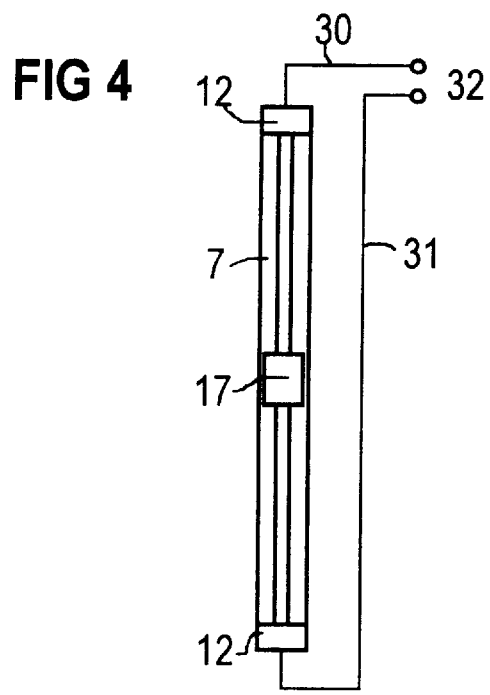
FIG. 4 is a plan view and circuit diagram showing external terminals of the temperature sensor of FIG. 2.

As is seen in FIG. 4, an external connection of the temperature sensor 7 is effected through two lines 30 and 31, each of which is soldered to a respective one of the outer solderable contact surfaces 12 and is connected to a plug 32.

Figure 5:
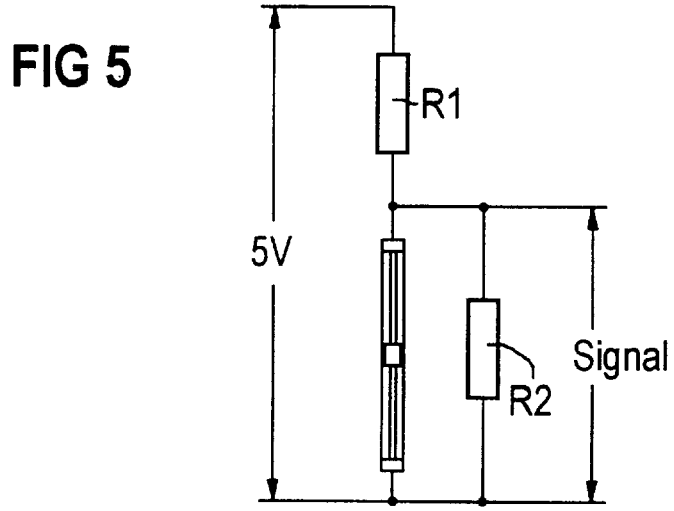
FIG. 5 is a circuit diagram showing external wiring of the temperature sensor of FIG. 2.

In order to generate and output an output signal corresponding to the temperature to be measured, in particular for an engine control unit, the temperature sensor 7 is electrically wired as follows with reference to FIG. 5: The sensor 7 is connected in series with a first resistor R1 to a 5-Volt voltage source. The output signal of the sensor 7 is picked up at a second resistor R2 located between its external terminals.

I claim:

1. A method for producing temperature sensors, which comprises:

applying a plurality of parallel conductor tracks to a glass plate forming first and second partial conductor tracks located one after the other;

providing each of the partial conductor tracks with one outer solderable contact surface and one inner contact surface;

electrically conductively connecting one respective sensor element formed of a temperature-dependent resistor body to the inner contact surface of each of the first partial conductor tracks;

applying a respective insulating resist track between the sensor element and the inner contact surface of each of the second partial conductor tracks;

electrically conductively connecting the sensor elements to the inner contact surface of the second partial conductor tracks;

coating the sensor elements and the inner contact surfaces with a resist layer; and cutting apart the glass plate with parallel cuts extending between the individual sensor elements to form a plurality of identical temperature sensors.

2. The method according to claim 1, which comprises selecting the temperature-dependent resistor body from the group consisting of a pill and a cube.

3. The method according to claim 1, which comprises joining the sensor element and the inner contact surface of the second partial conductor track with a conductive adhesive, and performing the step of coating the inner contact surfaces and the sensor element with the resist layer after the conductive adhesive hardens.

* * * * *

UNITED STATES PATENT AND TRADEMARK OFFICE
CERTIFICATE OF CORRECTION

PATENT NO. : 5,887,338
DATED : March 30, 1999
INVENTOR(S) : Andreas Wildgen

It is certified that error appears in the above-identified patent and that said Letters Patent is hereby corrected as shown below:

Title page,
Item [30], insert to read as follows:
-- Apr. 28, 1995  (DE) ........... 195 15 798.2 --

Signed and Sealed this

Thirtieth Day of April, 2002

Attest:

JAMES E. ROGAN
Attesting Officer   Director of the United States Patent and Trademark Office